(12) United States Patent
Pannese

(10) Patent No.: US 7,890,194 B2
(45) Date of Patent: Feb. 15, 2011

(54) ROBOTICS PROGRAMMING INTERFACE

(75) Inventor: Patrick Pannese, Lynnfield, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 644 days.

(21) Appl. No.: 11/302,563

(22) Filed: Dec. 13, 2005

(65) Prior Publication Data
US 2007/0135932 A1     Jun. 14, 2007

(51) Int. Cl.
G06F 19/00     (2006.01)
(52) U.S. Cl. .......................................... 700/17; 703/22
(58) Field of Classification Search ................ 700/17, 700/19, 30, 245–247, 249–253, 255, 264; 703/22, 15
See application file for complete search history.

(56) References Cited

U.S. PATENT DOCUMENTS

| | | | |
|---|---|---|---|
| 3,932,843 A | 1/1976 | Trelut et al. | |
| 5,218,709 A | 6/1993 | Fijany et al. | |
| 5,526,254 A | 6/1996 | Sato et al. | |
| 6,161,051 A | 12/2000 | Hafemann et al. | |
| 6,192,331 B1 * | 2/2001 | Gaessler et al. | 703/22 |
| 6,345,239 B1 | 2/2002 | Bowman-Amuah | |
| 6,463,358 B1 * | 10/2002 | Watanabe et al. | 700/253 |
| 6,944,584 B1 * | 9/2005 | Tenney et al. | 703/22 |
| 2005/0049749 A1 * | 3/2005 | Watanabe et al. | 700/245 |
| 2007/0135933 A1 | 6/2007 | Panesse et al. | |
| 2007/0282480 A1 | 12/2007 | Pannese et al. | |
| 2008/0134075 A1 | 6/2008 | Pannese et al. | |
| 2008/0134076 A1 | 6/2008 | Pannese et al. | |
| 2008/0147580 A1 | 6/2008 | Pannese | |
| 2008/0155442 A1 | 6/2008 | Pannese et al. | |
| 2008/0155443 A1 | 6/2008 | Pannese et al. | |
| 2008/0155444 A1 | 6/2008 | Pannese et al. | |
| 2008/0155445 A1 | 6/2008 | Pannese et al. | |
| 2008/0155446 A1 | 6/2008 | Pannese et al. | |
| 2008/0155447 A1 | 6/2008 | Pannese et al. | |
| 2008/0155448 A1 | 6/2008 | Pannese et al. | |
| 2008/0155449 A1 | 6/2008 | Pannese | |
| 2008/0155450 A1 | 6/2008 | Pannese et al. | |
| 2008/0163094 A1 | 7/2008 | Pannese et al. | |
| 2008/0163095 A1 | 7/2008 | Pannese et al. | |

(Continued)

FOREIGN PATENT DOCUMENTS

WO    WO-2007070812 A2    6/2007

OTHER PUBLICATIONS

Baglivo et al., An integrated hardware/software platform for both Simulation and Real-Time Autonomous Guided Vechiles Navigation, Jun. 2005, ECMS 2005, 19$^{th}$ European Conference on Modelling and Simulation, pp. 1-6.*

(Continued)

*Primary Examiner*—Kidest Bahta
(74) *Attorney, Agent, or Firm*—Perman & Green, LLP; Richard Pickreign

(57) ABSTRACT

A programming interface for a hardware system includes an embedded layer for programmatic access to a physical realization of hardware, a simulation system for simulation of the hardware, and a diagnostics engine that analyzes and compares feedback data from the simulation system and the physical realization. The programming interface may be usefully employed, for example, in the design, purchase, and deployment of robotics for semiconductor manufacturing.

56 Claims, 6 Drawing Sheets

U.S. PATENT DOCUMENTS

2008/0163096 A1 7/2008 Pannese et al.
2008/0167890 A1 7/2008 Pannese et al.
2008/0208372 A1 8/2008 Pannese

OTHER PUBLICATIONS

Gholkar et al., "Hardware-In-Loop Simulator for Mini Aerial Vehicle", [wwww.casde.iitb.ac.in/Publications/pdfdoc-2004/hils-singapore.pdf], Centre for Aerospace Systems Design and Engineering, 2004, pp. 1-6.*

Hong, Keum-Shik et al., "A PC-based open robot control system: PC-ORC", Science Direct, Jun. 2001, pp. 1901-1906.*

Samaka, M., "Robot Task-Level Programming Language and Simulation", PWASET vol. 9, Nov. 2005, pp. 99-103.*

Morandini, Marco et al., "A Real-Time Hardware-in-the-loop Simulator for Robotics Applications", Multibody Dynamis 2005, ECCOMAS Thematic Conference, Jun. 2005, pp. 1-11.*

"Notification Concerning Transmittal of International Preliminary Report on Patentability", (Sep. 4, 2008).

Keum-Shik, et al., "A PC-Based Open Robot Control System: PC-ORC", *Science Direct*, (Jun. 2001),1901-1906.

Gholkar, et al., "Hardware-In-Loop Simulator for Mini Aerial Vehicle", *Centre for Aerospace Systems Design and Engineering*, (2004),1-6.

Baglivo, et al., "An integrated hardware/software platform for both Simulation and Real Time Autonomous Guided Vehicles Navigation", *19th European Conference on Modelling and Simulation*,, (ECMS 2005),1-6.

Samaka, M "Robot Task-Level Programming Language and Simulation", *PWASET* vol. 9, (Nov. 2005),99-103.

Morandini, M. et al., "A Real Tuime Hardware-in-the-loop Simulator for Robotics Application", *ECCOMAS Thematic Conference Multibody dynamics*, (2005),1-11.

"International Application Serial No. PCT/US06/61960, Search Report mailed Jul. 11, 2008", P220,7 pgs.

"International Application Serial No. PCT/US06/61960, Written Opinion mailed Jul. 11, 2008", P237,8 pgs.

* cited by examiner

ROBOTICS PROGRAMMING INTERFACE

BACKGROUND

1. Field of the Invention

This invention relates to application programming interfaces for robotic systems, and more particularly, interfaces that optionally share control of simulated and physical systems.

2. Description of the Related Art

Computer simulation has long been used in a variety of fields to predict and evaluate behavior of physical systems prior to incurring the cost of physically realizing such systems in electromechanical form. While simulation has improved with increases in computational power, little has been done to systematically provide simulation tools to physical system users such as design engineers or end users of complex electromechanical systems such as manufacturing robotics systems. There remains a need for improved access to simulation technologies in commercial and design settings. A need also exists for simulation systems that operate effectively in real time, such as during operation of a machine.

SUMMARY

A programming interface for a hardware system may include an embedded layer for programmatic access to a physical realization of hardware, a simulation system for simulation of the hardware, and a diagnostics engine that analyzes and compares feedback data from the simulation system and the physical realization. The programming interface may be usefully employed, for example, in the design, purchase, and deployment of robotics for semiconductor manufacturing. In embodiments, the embedded layer and the simulation system operate simultaneously, allowing real-time, simultaneous access to tools for computer simulation (e.g., for diagnostic purposes, for simulating activities of a machine, or the like) and tools for physical control.

BRIEF DESCRIPTION OF THE FIGURES

The invention and the following detailed description of certain embodiments thereof may be understood by reference to the following figures.

DETAILED DESCRIPTION

Described below is a programming interface for simulation (optionally including virtual reality simulation), diagnosis and control of a machine, which may be manufacturing system, such as a robotic manufacture system, and more particularly may be a robotic manufacturing facility for semiconductor manufacturing, such as vacuum-based manufacturing. While such a system may be usefully employed in semiconductor manufacturing, and the design, purchase, and use of robotic systems therefore, it will be appreciated that the inventive concepts disclosed herein are not limited to semiconductor manufacturing robotics. Rather, the concepts disclosed herein have wide applicability to any systems that are amenable to simulation and include a control interface with command outputs and sensor inputs or feedback. This may include, for example, food processing systems, manufacturing systems, automated warehouse management, or any other systems with similar characteristics, and all such variations and alternative uses are intended to fall within the scope of this disclosure.

Figure 1:
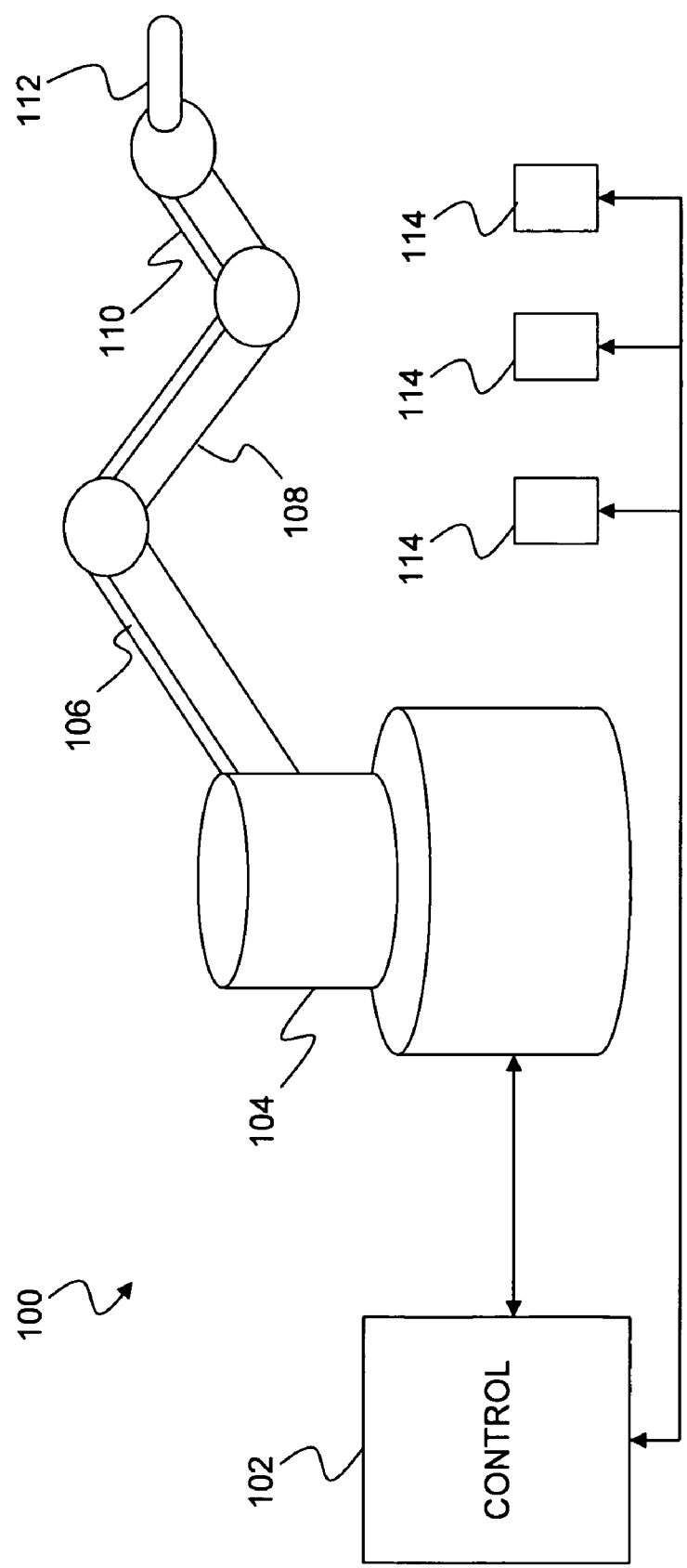
FIG. 1 shows a physical realization of a robotics system.

FIG. 1 shows a physical realization of a robotics system. In an example embodiment, a robotic system 100 may include a control system 102, a base 104, one or more arms 106, 108, 110, and an end effector 112. Robots may be used for various purposes, from working in harsh environments, to working in specialized environments such as vacuums, to simple picking and placing work.

The control 102 may include hardware and/or software to drive the motors of the various arms 106, 108, 110 and may include a data storage facility, such as a memory to record path motions, such as in a path motions file, as well as recording other operation data for the robotics system 100. The control 100 may be connected to a base 104 that may be shaped and sized to aid in the positioning of the arms 106, 108, 110 and the movement and activation of the end effector 112 in, for example, a manufacturing process. The base 102 may additionally include various motors for effecting movement of the arms 106, 108, 110 and end effector 112. Although three arms are illustrated, it will be appreciated that fewer or more arms, each of varying lengths, may be employed with the robotic systems 100 described herein. Multiple arms 106, 108, 111, such as those depicted in FIG. 1, permit the illustrated robotic arm to reach around or over other objects, and to extend up to the full length of the combined arms 106, 108, 110. In addition to arms the base 104 or some other portion of the robotic system 100 may include actuators for linear or other vertical, horizontal, or other planar motion. In embodiments, positions of other robotic components, such as wheels, gears, carts, drive mechanisms, cameras, sensors, and the like may be controlled in a manner similar to the arms 106, 108, 111.

In embodiments the end effector 112 may provide for manipulation of a tool or work piece, such as a wafer in a semiconductor manufacturing process. The end effector 112 may include, for example a gripper, a pincer, a fork, a tray, a platform, a finger, a nozzle, a vacuum grip, a tumble gripper, a passive centering gripper, or any other tool or tools that might be useful in the robotic system 100. The end effector 112 may, for example, be used to move or grab objects within a manufacturing process. Other components that may be used within the robotic system 100 include, for example, a valve, an arm, a multi-link arm, a door, a seal, an elevator, a conveyer, a belt, a chain, a cart or the like.

The arms 106, 108, 110 of the robotic system 100 may be modeled and controlled, for example, using equations of motion, such as inverse kinematics (IK) equations that describe the motion of a feature, such as a multi-armed device, in a coordinate system. Generally, a set of equations may be established that describe each sub-part of a machine, such as a robot, based on the dimensions of the machine and its degrees of freedom, such as its ability to translate, to rotate, or to pivot about one or more points of pivot. IK equations may be used, for example, to predict the placement of an end point of a device based on the motion of the movable components or predict the motion of the movable components based on the position of the end point.

It will be appreciated that, while FIG. 1 shows a number of robotic arms 106, 108, 110 that can be modeled as an IK device, any number of other types of components may also, or instead, be included in the robotic system 100. For example, a semiconductor wafer handling system may include chemical vapor deposition components, etching components, lithography components, vacuum creation and monitoring components, vacuum isolation valves, heating or cooling systems, conveyers, elevators, entry and exit control (e.g., opening, closing, and vacuum sealing doors or other ports), cleaning systems, and/or other automated or human inspection systems.

Further, processing tools may be chained together into linear or other clusters for various processing steps. In such a system the robotics system 100 may, in addition to controlling a variety of process steps and parameters, manage physical movement of a wafer from tool to tool, and through buffer stations, if any.

The robotic system 100 may also include one or more sensors 114. Sensors may be used, for example, to track the position of a work piece or the operating environment of the robotic system 100. Thus for example, the sensors 114 may include temperature sensors (e.g., ambient temperature, process temperature, work piece temperature, and so on), atmospheric pressure sensors, motion sensors, proximity sensors, weight sensors, light sensors, voltage sensors, sound sensors and so on. The sensors 114 may detect the presence of, or concentration of, a gas or other substance within the process environment. The sensors 114 may employ a variety of techniques for detecting position and other parameters, such as optical beams (with, e.g., emitter/detector beam paths), infrared, RF, sonar, capacitive and/or magnetic sensing techniques or other imaging and sensing techniques. The sensors 114 may detect a state of a component of the robotic system 100 or a work piece, such as a position of, direction of, or distance to a work piece, or a distance to an obstruction, a valve status, a seal status, a door position, or a diagnostic state (e.g., okay, malfunctioning, etc.). More generally, the sensors 114 may employ any suitable technology for gathering sensor data consistent with the use of the robotic system 100. In one embodiment, one or more of the sensors 114 may be sealed within a processing chamber and communicate with the control 102 through a wireless data/control link such as IEEE Standard 802.11b or 802.11g.

As the foregoing examples illustrate, a wide number of components, sensors, and actuators may be employed with the robotic system 100 described herein, and all such components, sensors, and actuators are intended to fall within the scope of this disclosure.

Figure 2:
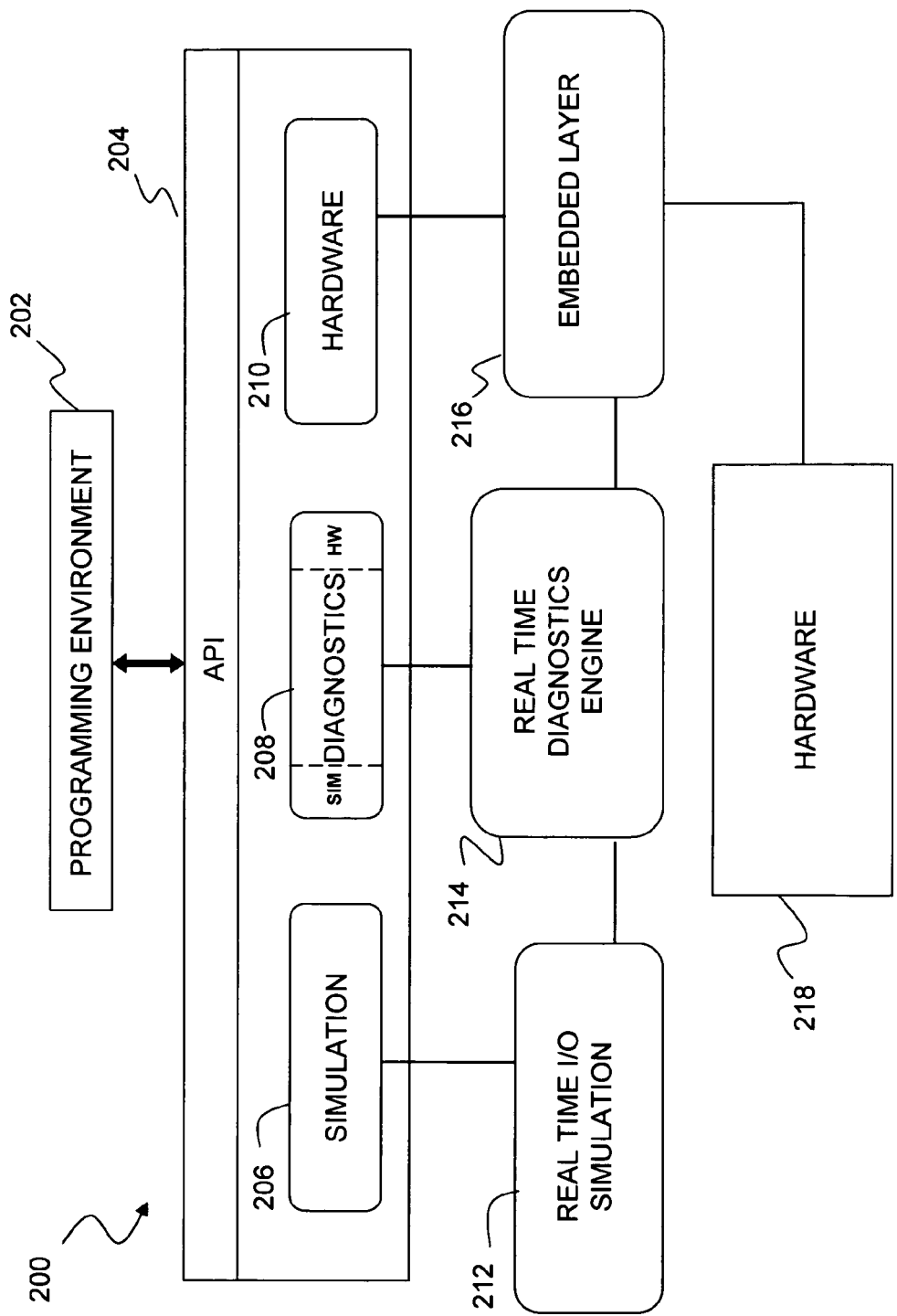
FIG. 2 shows a software architecture for a robotics system

FIG. 2 shows a software architecture for a robotics system. The architecture 200 may include, for example, an external programming environment 202, an application programming interface 204, a simulation module 206, a diagnostics module 208, and a hardware module 210. The simulation module 206 may be instantiated as a real time simulation input/output 212. The diagnostics module 208 may be instantiated as a diagnostics engine 214 that interconnects the simulation module 206 and the hardware module 210. The hardware module 210 may be instantiated as an embedded layer 216 that communicates with a physical realization of hardware 218. The architecture 200 may be used with a variety of robotic and other hardware and/or control systems, including, for example, the robotic system 100 described above with reference to FIG. 1.

The external programming environment 202 may include, for example, a .NET object layer for user with Microsoft's NET software development platform. The .NET framework offers a development environment for Microsoft Windows and web applications, as well as more atomic components and web services. While the NET framework is one useful programming paradigm for deploying services and various Internet and intranet applications, it will be appreciated that other environments may also, or instead, be usefully employed with the robotics systems described herein. For example, a distributed computing environment may be supported by Java EE from Sun or Component Object Model ("COM"), Microsoft's precursor to .NET. Similarly, the modules 206, 208, 210 may be packaged as libraries or subroutines for a standalone application, or may be deployed as a service, such as a web service (such as in a services oriented architecture), or through a web-accessible interface. All such software implementations, as well as variations and combinations thereof, are intended to fall within the scope of this disclosure.

The application programming interface ("API") 204 may communicate with the programming environment 202 using, for example data messages, a TCP packet stream, or any other message-oriented, connection-oriented, serial, or other communications protocol. The API 204 serves as a programming interface for a simulation environment such as the simulation module 206, controller for hardware, such as the hardware module 210, and a diagnostic system such as the diagnostic module 208. In one embodiment, the API 204 exchanges data messages with the .NET object layer of the external programming environment 202. More generally, the API 204 may include any set of definitions of the ways an external computer system (e.g., from the external programming environment 202) communicates with the internal functional modules of the architecture 200 (e.g., the modules 206, 208, 210 presented by the API 204). Thus, any predefined programmatic interface may be used as the API 204 of the architecture 200, provided the API 204 may be suitably adapted to the external programming environment 202 on one hand and the simulation module 206, the diagnostics engine 208, and the hardware module 210, on the other hand.

In one aspect, the API 204 may accommodate explicit access to each of the modules 206, 208, 210, so that a programmer may, for example, configure, refine, load, customize, analyze, or otherwise manipulate the simulation, the diagnostics engine, and/or the embedded controller or other layers of the hardware interface. Thus, for example, a user may access the simulation module 206 during a teaching phase or automated teaching phase in which robotic arms and/or other parts are trained to safely operate within physical boundaries and constraints of an environment. The results may be transferred to the hardware module 206 (or retained as constraints within, e.g., the diagnostic module 208) for use in subsequent control of physically realized hardware 218. In another aspect, the API 204 may not differentiate between use of the simulation module 206 and the hardware module 210. In this latter embodiment, the API 204 may be presented as a simple hardware controller that provides, in addition to other outputs, diagnostic feedback summarizing deviations from expected hardware behavior, i.e., output from the diagnostic module 208. In another aspect, the API 204 may have two operating modes, a design mode in which full access is provided, and a user mode configured for distribution to end users of the robotic system 100.

The simulation module 206 may simulate the physical realization of hardware 218, along with the hardware module 210 and any other control or data interfaces of the hardware 218. In an embodiment, the simulation module 206 may provide a real time input/output simulation 212 of the hardware 218 (including any embedded layer 216), such that the input/output interface of the simulation module 206 substantially corresponds to the input/output interface of the hardware module 210. The application programming interface may, for example, maintain consistency by concurrently feeding external inputs to the hardware module 210 and the simulation module 206. In embodiments, the simulation module may take as inputs three-dimensional models from one or more three-dimensional visualization modules, such as commercially available modules available from SolidWorks®.

A variety of simulation techniques are known, and may be usefully employed with the simulation module 206. This may include, for example physical modeling of robotic components and the environment of the robotic system 100. Physical modeling may embrace such features of the system and environment as temperature, heat transfer, wear, sensors and sensor input/output, thermal dynamics, electrical and magnetic behavior, optical features, vibration and resonance behaviors, solid state and crystalline behavior, thermal expansion and contraction, statistical mechanics, Newtonian physics, inverse kinematics and other behavior of interconnected physical parts, pressure, fluid flow, gas flow, and so on. The simulation may also, or instead, employ statistical models, heuristic models, linear models, qualitative models, decision analysis models, decision trees and any other modeling or behavioral techniques useful for characterizing and predicting responses. The simulation module may embrace elements of the hardware input and output such as data acquisition, signal processing, and the like. More generally any aspects of the hardware 218 and hardware module 210 useful for an accurate or real time simulation may be usefully incorporated in a simulation executed by the simulation module 206.

The simulation module 206 may update using any time base or time frame. One common time interval for industrial control systems is twenty milliseconds. Thus, in one corresponding embodiment, real time operation of the simulation module 206 may be satisfied by any combination of hardware and software that fully updates simulation results in twenty milliseconds or less. It will be appreciated that other faster or slower update times may be employed, according to particular hardware module 210 behaviors, and the adaptability of the diagnostic module 208 to asynchronous data from the hardware module 210 and the simulation module 206. A variety of signal processing techniques are available for upconversion, downconversion, and interpolation of time based data to accommodate timing constraints between these modules.

In general, the diagnostics module 208 may perform diagnostic functions, such as based on comparisons of the differences between operation of the robotic system, as received from the hardware module 210, and operation of the simulation, as received from the simulation module 206. In an embodiment, the diagnostic module 208 includes a diagnostic engine 214 for real time comparison of simulation and actual data. The diagnostics module 208 may provide various types of analysis concerning the relationship of outputs from the hardware module 210 and the simulation module 206. For example, the diagnostics module 208 may provide statistical analysis that accommodates small, statistically acceptable deviations without generating a diagnostic message. The diagnostics module 208 may also, or instead, provide a direct data feed of a differential between expected and actual results, which may be passed through the API 204 for independent analysis and use by an end user. The diagnostics module 208 may also, or instead provide analysis of deviations with specific error messages indicating known and unknown error conditions. This may include, for example, identification of malfunctioning parts, malfunctioning sensors, or malfunctioning interfaces. The diagnostics module 208 may optionally embody statistical models for diagnosis and predictions of faults, including qualitative reasoning methods, methods based on statistical process control, methods based on failure mode effects analysis, or models that combine features of the foregoing, as well as combine any of the foregoing with the outputs of the simulation module 206.

In another aspect, the diagnostics module 208 may further provide control signals to the hardware module, such as based upon diagnosis of a malfunction. This may include, for example, a signal to shut down an individual component, a group of related components, or an entire system, or to otherwise alter the operation of the foregoing. Shut down commands and other diagnostic-derived control signals, and triggers therefore, may be user configured based upon, for example, safety risks, work-in-progress value and/or cost, expected damage to one or more work pieces, expected damage to equipment, and so forth. The diagnostics module 208 may also, or instead, provide predictive maintenance, such as advance notification of component malfunctions or the identification of maintenance requirements such as filter changes, battery replacements, fluid changes, and the like.

The hardware module 210 may encapsulate, or include an interface to, the embedded layer 216 of a physical realization of hardware 218. At this interface, control and command data may be provided to the hardware 218 through a direct or indirect physical connection. This may include, for example, low level commands such as step motor settings, voltages on control lines, and the like, or this may include higher level commands in computer or human readable syntax, which may be interpreted by the embedded layer 216 for direct activation of hardware 218. This may also include data from the hardware 218 including, for example, raw or preprocessed sensor data, status and control feedback, and the like.

In one aspect, the hardware module 210 may simplify programmatic access to the hardware 218 by providing an abstracted command interface for use at the API 204 level. In another aspect, the hardware module 210 may implement control systems for operation of the hardware 218. This may include, for example, discrete control algorithms implemented as look-up tables or logic, or analytical control algorithms implementing feedback control and so on. The API 204 may expose optional use of such control algorithms, access to parameters thereof, and/or direct programming of arbitrary control algorithms. Thus, in general, varying degrees of control abstraction and varying degrees of control intelligence and automation may be incorporated into the hardware module 210, and into the simulation module 206 version thereof. It will also be appreciated that the hardware module 210 may include different design and runtime instances of a hardware controller. The design instance may, for example be created in a human readable form, or a dynamically re-configurable form such as an interpreted programming language. The runtime instance may, instead, be compiled to execute on a controller associated with the hardware 218, which may include, for example, one or more application specific integrated circuits, microprocessors, microcontrollers, or other programmable devices.

The physical realization of hardware 218 may be, for example, any of the robotic systems 100 described above with reference to FIG. 1, or more generally, any hardware with a command, control, data, and/or sensor interface. User commands received through the API 204, or internally generated commands from within the hardware module 210, the diagnostics module 208, or other source, may be transmitted to the hardware 218 through any suitable interconnection with the hardware module 210, such as Ethernet, RS-232, or any other direct or indirect input/output, network, or other interconnection. Sensor data may be provided in analog or digital form, and may be preprocessed by the hardware 218 to provide, e.g., calibration, serialization, digitization, and so on.

According to the foregoing, a method described herein includes providing a simulation of hardware, providing a physical realization of the hardware, providing a programming interface to control the hardware, and interconnecting one or more of the simulation, the physical realization, and the programming interface in a communicating relationship. Thus, a robotic system, a simulation of the robotic system, and a programming interface may be arbitrarily interconnected to one another. Such a method of interconnection may allow for independent programmatic access to, e.g., the simulation process for programming modifications, or simulated training of the system, alongside independent programmatic access to the hardware controller for implementation of new control algorithms, system configuration, or any other purpose. This method of interconnection may also, or instead, permit direct comparison of simulation results and hardware sensor data in real time.

In another aspect, a method according to the above description may include controlling a robotic system, receiving sensor data from the robotic system, concurrently executing a simulation of the robotic system in real time, receiving simulated sensor data from the simulation; and comparing the sensor data to the simulated sensor data.

It will also be appreciated that a wide range of software and hardware platforms may be used to create and deploy the above-described software components such as the simulation module 206, the diagnostics module 208, and the hardware module 210. Generally, the components may be realized in hardware, software, or some combination of these. The components may be realized in one or more microprocessors, microcontrollers, embedded microcontrollers, programmable digital signal processors or other programmable devices, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. The components may also, or instead, include an application-specific integrated circuit, a programmable gate array, programmable array logic, or any other device or devices that may be configured to process electronic signals in a manner consistent with the systems and methods described herein.

Any combination of the above circuits and components, whether packaged discretely, as a chip, as a chip set, or as a die, may be suitably adapted to use with the systems described herein. It will further be appreciated that the above software components may be realized as computer executable code created using a structured programming language such as C, an object oriented programming language such as C++, or any other high-level or low-level programming language that may be compiled or interpreted to run on one of the above devices, as well as heterogeneous combinations of processors, processor architectures, or combinations of different hardware and software. All such variations and combinations are intended to fall within the scope of this disclosure.

It should also be appreciated that the recurring example provided above—semiconductor manufacturing robotics—is only one example of a possible use of the programming and control system disclosed herein. The system described with reference to FIGS. 1-3 may be employed with suitable adaptations for control and diagnostics in a variety of real time control contexts, including, for example automobile manufacturing assembly lines, machining processes, printing presses, industrial automation control systems (such as those provided by Invensys, Honeywell, Siemens, et al), building automation systems, security systems, Computer Numeric Control ("CNC") machining systems, and so on. The systems and methods described above may also be used for diagnostics in human-operated machinery such as an operating automobile, an operating airplane (military or civilian), an operating tank, an operating extraterrestrial vehicle (such as a space shuttle, space station, space dock), and so forth. These and other similar uses not specifically enumerated herein are intended to fall within the scope of this disclosure.

Figure 3:
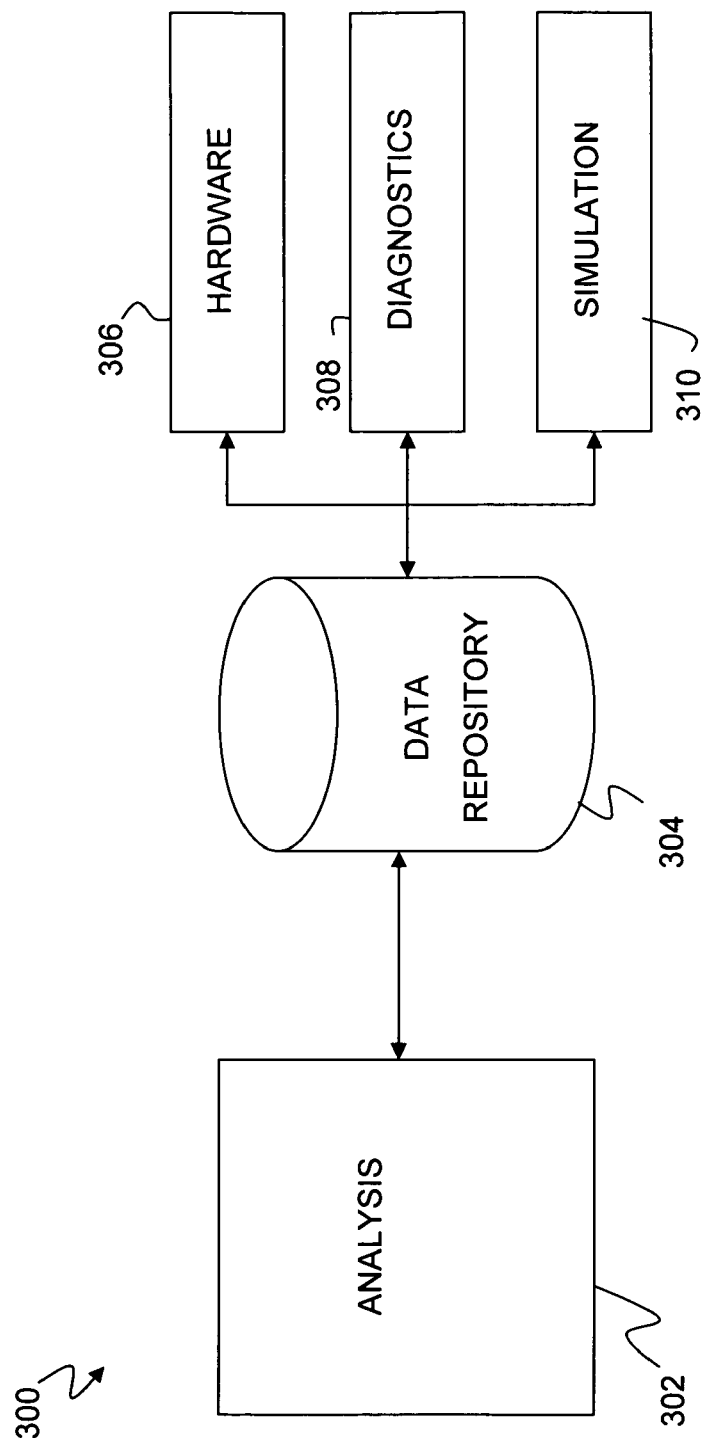
FIG. 3 shows a data repository for data acquisition and analysis.

FIG. 3 shows a data repository for data acquisition and analysis. As illustrated an analysis engine 302 may use data in a data repository 304 generated from a hardware module 306, a diagnostics module 308, and a simulation module 310.

The analysis engine 302 may provide one or more tools for analyzing data within the data repository 304. This may include, for example tools for improving diagnostic functions such as detection of malfunction, tools for statistical analysis of hardware and simulation data, and deviations among these. The analysis engine 302 may pool data from a number of robotic systems, which may include similar or identical robotic systems as well as disparate robotic system, and provide tools for comparative analysis thereof.

In one aspect, the analysis engine 302 may provide a diagnostics tool kit for identification and analysis of diagnostically significant relationships. This may include, for example, statistical analysis tools, linear system modeling tools, frequency domain analysis tools, and so forth. Using the diagnostics tool kit, new relationships that are identified from data in the data repository may be deployed as new diagnostic analyses current and/or future diagnostics modules. Similarly, existing diagnostics may be refined and tested against data in the data repository 304. As diagnostic techniques are developed using the diagnostics tool kit, they may be back-tested against data in the data repository using the analysis engine.

To enhance use of the analysis engine 302 and the diagnostics tool kit, certain know fault modes, such as a motor failure, pressure leak, wafer defect, or the like may be copied into a separate location or otherwise flagged for use and re-use.

The data repository 304 may be any mass storage device suitable for the volume and rate of data acquisition from a system such as any of the robotic systems 100 described above. This may include, for example semiconductor memory devices, optical memory devices such as CD-ROM or DVD-ROM, network attached storage, storage area network devices, magnetic disk drives, magnetic tape drives, or any other volatile or non-volatile memory device. The data repository 304 may also include arrays of such devices such as farms, RAID arrays, and the like. In addition to the physical media for storage, the data repository 304 may include a database management system such as those commercially available from Microsoft Corporation, International Business Machines, and Oracle, as well as a number of open source software projects.

The hardware module 306, diagnostics module 308, and simulation module 310 may be, for example, the modules 206, 208, 210 described above with reference to FIG. 2. These modules 306, 308, 310 may feed data directly to a local data repository 304, or may provide data over a local area network, storage area network, wide area network, private network, or the like. Data may include, for example, control and command data provided to the hardware module 306, sensor and other feedback data received from the hardware module 306 and/or simulation module 310, and diagnostic information, if any, received from the diagnostics module 308. The data may include actual and simulated real time data. Data may be incrementally forwarded to the data repository 304, or locally cached and forwarded in batches at appropriate times, or combinations of these. More generally, any suitable technique for transferring data from the modules 306, 308, 310 to the data repository 304 may be employed with the systems described herein.

Figure 4:
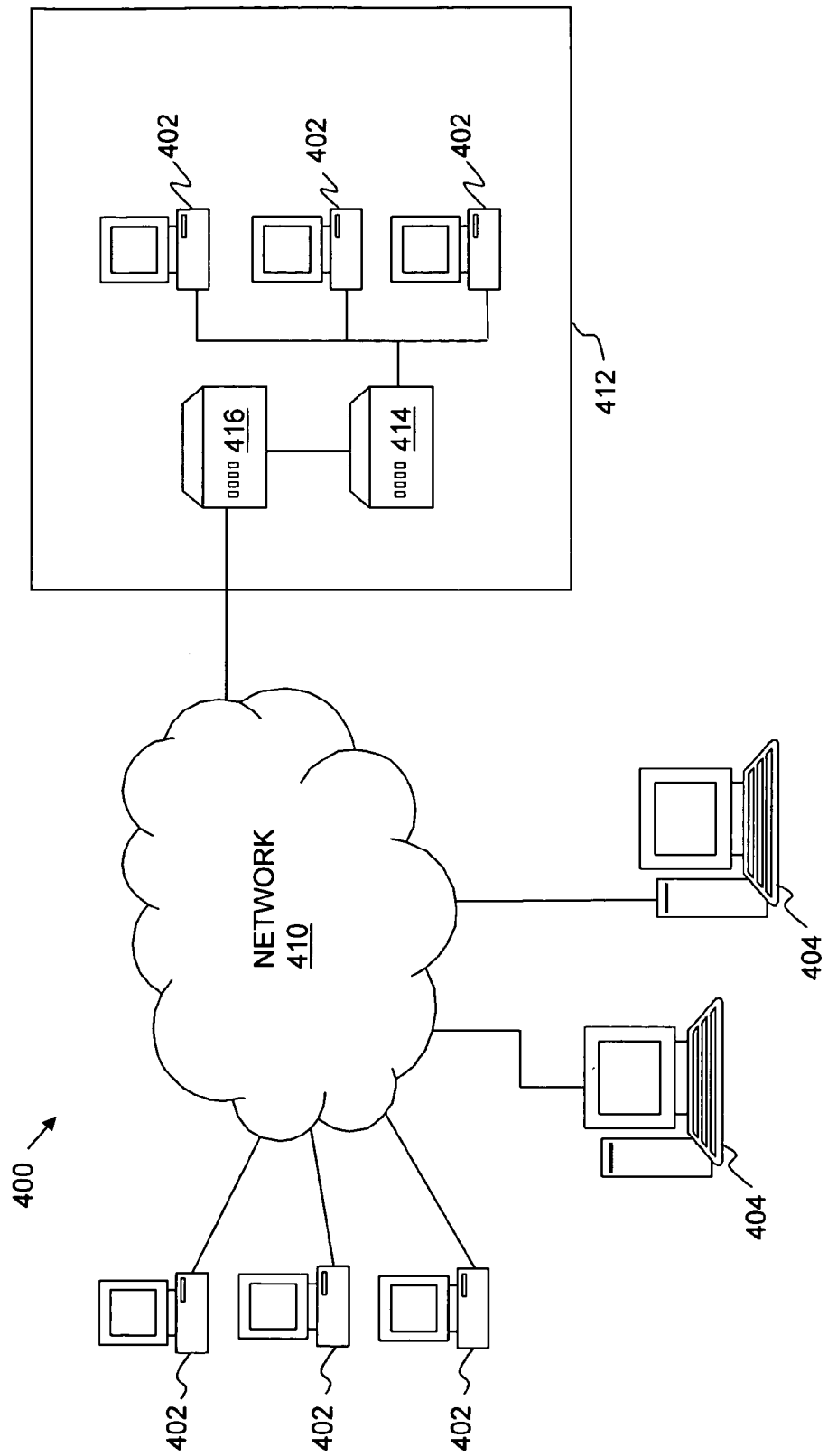
FIG. 4 shows a network.

FIG. 4 shows a network that may be used to deploy a web-based business using the simulation systems described herein. As shown in FIG. 4, a network 400 may include a plurality of clients 402 and servers 404 connected via an internetwork 410. Any number of clients 402 and servers 404 may participate in such a system 400. The system may further include one or more local area networks ("LAN") 412 interconnecting clients 402 through a hub 414 (in, for example, a peer network such as a wired or wireless Ethernet network), router 414, or a local area network server 414 (in, for example, a client-server network). The LAN 412 may be connected to the internetwork 410 through a gateway 416, which provides security to the LAN 412 and ensures operating compatibility between the LAN 412 and the internetwork 410. Any data network may be used as the internetwork 410 and the LAN 412.

In one embodiment, the internetwork 410 is the Internet, and the World Wide Web provides a system for interconnecting clients 402 and servers 404 in a communicating relationship through the Internet 410. The internetwork 410 may include other networks, such as satellite networks, the Public Switched Telephone Network, WiFi networks, WiMax networks, cellular networks, and any other public, private, or dedicated networks that might be used to interconnect devices for transfer of data.

An exemplary client 402 may include a processor, a memory (e.g. RAM), a bus which couples the processor and the memory, a mass storage device (e.g. a magnetic hard disk or an optical storage disk) coupled to the processor and the memory through an I/O controller, and a network interface coupled to the processor and the memory, such as modem, digital subscriber line ("DSL") card, cable modem, network interface card, wireless network card, or other interface device capable of wired, fiber optic, or wireless data communications. One example of such a client 402 is a personal computer equipped with an operating system such as Microsoft Windows XP, UNIX, Linux, or Mac OS X, along with software support for Internet communication protocols. The personal computer may also include a browser program, such as Microsoft Internet Explorer or FireFox to provide a user interface for access to the internetwork 410. Although the personal computer is a typical client 402, the client 402 may also be a workstation, mobile computer, Web phone, VOIP device, television set-top box, interactive kiosk, personal digital assistant, wireless electronic mail device, or other device capable of communicating over the Internet. As used herein, the term "client" is intended to refer to any of the above-described clients 402 or other client devices, and the term "browser" is intended to refer to any of the above browser programs or other software or firmware providing a user interface for navigating an internetwork 410 such as the Internet.

An exemplary server 404 includes a processor, a memory (e.g. RAM), a bus which couples the processor and the memory, a mass storage device (e.g. a magnetic or optical disk) coupled to the processor and the memory through an I/O controller, and a network interface coupled to the processor and the memory. Servers may be clustered together to handle more client traffic, and may include separate servers for different functions such as a database server, an application server, and a Web presentation server. Such servers may further include one or more mass storage devices such as a disk farm or a redundant array of independent disk ("RAID") system for additional storage and data integrity. Read-only devices such as compact disk drives and digital versatile disk drives may also be connected to the servers. Suitable servers and mass storage devices are manufactured by, for example, Hewlett-Packard, IBM, and Sun Microsystems. In addition to providing an interface for clients 402 visiting a Web site, the server 404 may provide back-end processing that includes, for example access to the simulation and diagnostic functions of the architecture 200 described above.

Focusing now on the internetwork 410, one embodiment is the Internet. The structure of the Internet 410 is well known to those of ordinary skill in the art and includes a network backbone with networks branching from the backbone. These branches, in turn, have networks branching from them, and so on. The backbone and branches are connected by routers, bridges, switches, and other switching elements that operate to direct data through the internetwork 410. For a more detailed description of the structure and operation of the Internet 410, one may refer to "The Internet Complete Reference," by Harley Hahn and Rick Stout, published by McGraw-Hill, 1994. However, one may practice the present invention on a wide variety of communication networks. For example, the internetwork 410 can include interactive television networks, telephone networks, wireless voice or data transmission systems, two-way cable systems, customized computer networks, Asynchronous Transfer Mode networks, and so on. Clients 402 may access the internetwork 410 through an Internet Service Provider ("ISP", not shown) or through a dedicated DSL service, ISDN leased lines, T1 lines, OC3 lines, digital satellite service, cable modem service, or any other suitable connection.

In an exemplary embodiment, a browser, executing on one of the clients 402, retrieves a Web document at an address (a Uniform Resource Locator ("URL"), an IP address, or other identifier) from one of the servers 404 via the internetwork 410, and displays the Web document on a viewing device, e.g., a screen. A user can retrieve and view the Web document by entering, or selecting a link to, a URL in the browser. The browser then sends an http request to the server 404 that has the Web document associated with the URL. The server 404 responds to the http request by sending the requested Web document to the client 402. The Web document may be an HTTP object that includes plain text (ASCII) conforming to the HyperText Markup Language ("HTML"). Other markup languages are known and may be used on appropriately enabled browsers and servers, including the Dynamic HyperText Markup Language ("DHTML"), the Extensible Markup Language ("XML"), the Extensible Hypertext Markup Language ("XHTML"), and the Standard Generalized Markup Language ("SGML").

To enhance functionality, a server 404 may execute programs associated with Web documents using programming or scripting languages, such as Perl, C, C++, C#, or Java, or a Common Gateway Interface ("CGI") script to access applications on the server. A server 404 may also use server-side scripting languages such as ColdFusion from MacroMedia or PHP. These programs and languages may perform "back-end" functions such as order processing, database management, and content searching. A Web document may also contain, or include references to, small client-side applications, or applets, that are transferred from the server 404 to the client 402 along with a Web document and executed locally by the client 402. Java is one popular example of a programming language used for applets. The text within a Web document may further include (non-displayed) scripts that are executable by an appropriately enabled browser, using a scripting language such as JavaScript or Visual Basic Script. Browsers may further be enhanced with a variety of helper applications to interpret various media including still image formats such as JPEG and GIF, document formats such as PPT and PDF, motion picture formats such as AVI and MPEG, animated media such as Flash media, and sound formats such as MP3 and MIDI. These media formats, along with a growing variety of proprietary media formats, may be used to enrich a user's interactive and audio-visual experience as each Web document is presented through the browser. The term "page" as used herein is intended to refer to the Web document described above, as well as any of the above-described functional or multimedia content associated with the Web document.

In general operation, a server 404 may provide a web site including one or more web pages to a client 402. In an exemplary embodiment, the web site may include an environment for specifying and purchasing robotic systems as described below.

Figure 5:
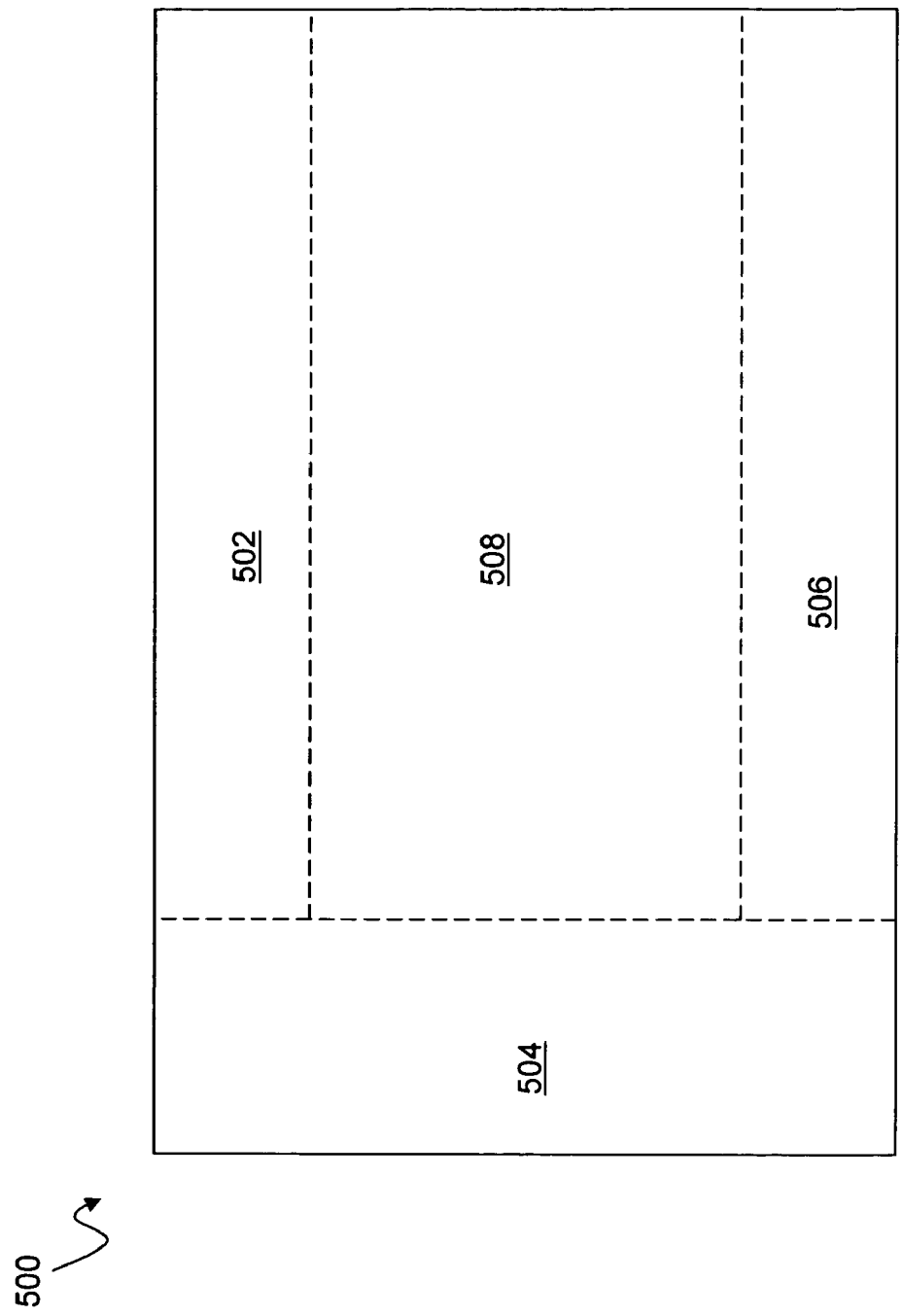
FIG. 5 shows a user interface.

FIG. 5 shows a user interface that may be used in a client device to view a Web site. The user interface may be presented, for example, through a Web page viewed using a Web browser. The page 500 may include a header 502, a sidebar 504, a footer 506 and a main section 508, all of which may be displayed at a client 402 such as the clients 402 described above. The header 502 may include, for example, one or more banner advertisements, a title of the page, and information about a source provider such as a company providing the page 500. The sidebar 504 may include a menu of choices for a user at the client 402, such as access to product catalogs, component specifications, purchasing information, and so on. The footer 506 may include another banner advertisement, and/or information concerning the page such as a "help" or "webmaster" contact, copyright information, disclaimers, a privacy statement, an the like. The main section 508 may include content for viewing by the user, such as information about various robotics components and systems. The main section 508 may also include, for example, tools for selecting components, inputting parameters, evaluating costs and order delivery times, and so on. It will be appreciated that this description is generic, and that the format of an actual page 500 used as a user interface for a robotics ordering system may be varied and supplemented in numerous manners. The page 500 may also adapt dynamically to use patterns at a client 402, and/or according to any available information about the client 402 (such as display size, media capabilities, etc.) or the user (such as profile information).

A Web site including the page 500 may use cookies to track users and user information. In particular, a client 402 accessing the site may be accessed to detect whether the client 402 has previously accessed the page or the site. If the client 402 has accessed the site, then some predetermined content may be presented to the client 402. If the client 402 does not include a cookie indicating that the client 402 has visited the site, then the client 402 may be directed to a registration page where information may be gathered to create a user profile. The client 402 may also be presented with a login page, so that a pre-existing user on a new client 402 may nonetheless bypass the registration page.

The site may provide options to the client 402. For example, the site may provide a search tool by which the client 402 may search for content within the site, or content external to the site but accessible through the internetwork 410. The site may include payment processing through banking and third party transaction systems including credit card processing, PayPal transaction processing, wire transfer processing, and the like.

Figure 6:
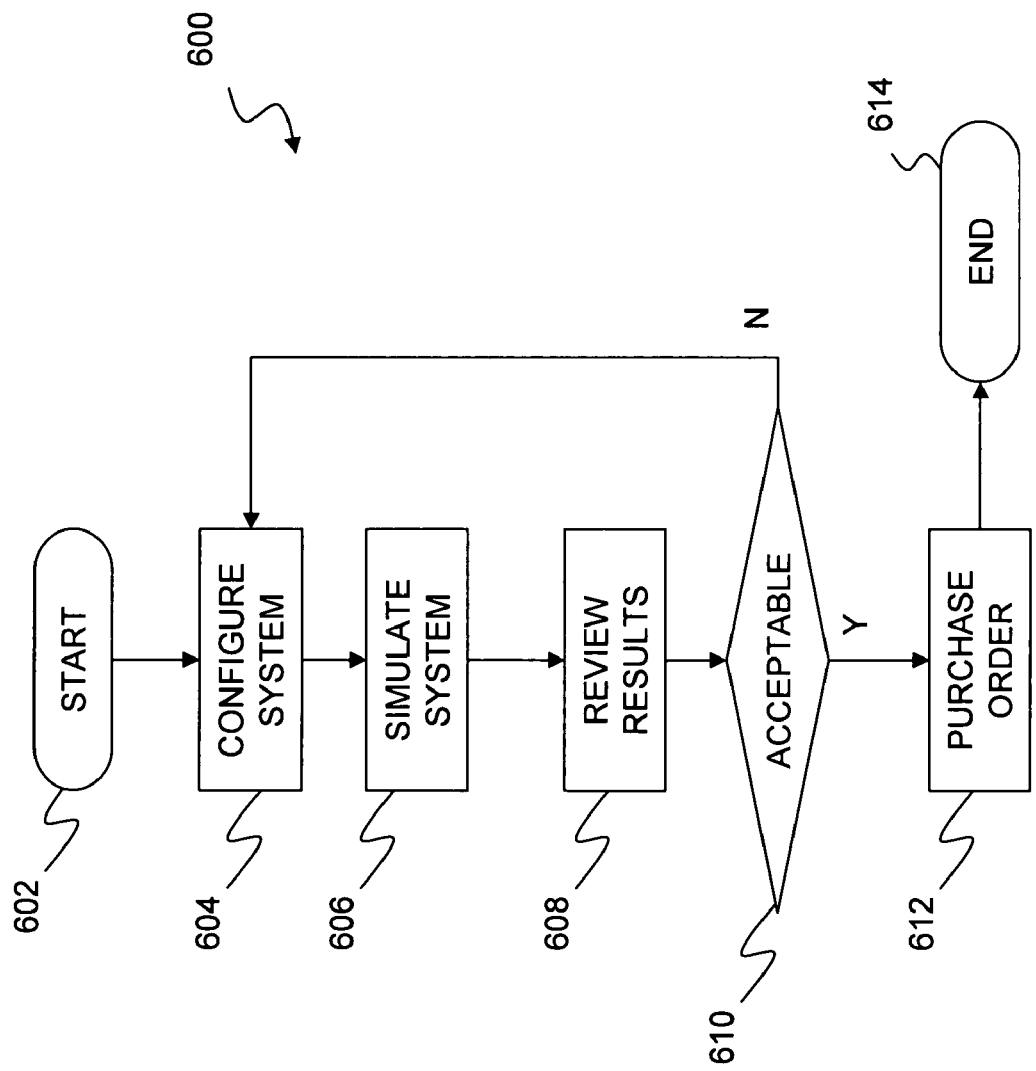
FIG. 6 illustrates a process for purchasing a robotics system.

FIG. 6 illustrates a process for purchasing a robotics system using the system described above. The process may involve, for example, a user of a client device, such as any of the clients 402 described above, accessing a server, such as any of the servers 404 described above, through an interface rendered as a Web page, such as any of the pages 200 described above. The process 600 may start, as illustrated in step 602, with a user visiting a robotics purchasing site on a server, such as any of the servers 404 described above, from a client such as any of the client 402 described above. The server may request log on credentials, or employ any other password-based, certificate-based, or other authentication or security measures to prevent unauthorized access to the server. This may be useful, for example, were a provider of manufacturing equipment wishes to offer customers access to cost and design information while excluding competitors.

As shown in step 604, a user may configure a system, such as a robotic semiconductor manufacturing system. This may include selection of individual robotic components, as well as pre-configured assemblies that include a number of different components. Features such as sensors, control software, and the like may be selected as options. The interface may permit pick-and-place arrangement of components into a working system. The interface may permit physical arrangement of components, as well as the specification of mechanical and electrical relationships among components of the system.

In an embodiment, a user may design custom mechanical components or electrical circuitry using a Computer Automated Design ("CAD") system offered through the web site, or may upload custom components in a CAD format acceptable to the site, such as a format amenable to either direct simulation, or conversion to a simulation-ready format. Configuration may include physical arrangement of mechanical and electrical parts, as well as provision of control software which may be provided by the user or by the site, or some combination of these. More generally, the interface may permit a wide range of user customization, or may constrain a user to certain configuration parameters, such as component selections and physical arrangements, specific to an industrial application for which the site is adapted. Thus, for example, in a semiconductor manufacturing application, the interface may specify a discrete number of workstation shapes, sizes, and entry/exit modes, and a specific collection of robotics components, such as robotic arms, individual robotic arm links, conveyers, elevators, actuators, motors, sensors, controllers (including individual chips and integrated controller systems) and so forth, to be combined with the workstation(s) for wafer handling.

Once a system has been specified in simulation-ready detail, the site may simulate the system as shown in step 606. The simulation may use, for example, the simulation module 206 described above. For diagnostic purposes, a hardware module may be similarly simulated, or hardware module input/output may be obtained from, or derived from, historical data in a data repository, such as the data repository 304 described above. The user may specify operating conditions, duration, speed, work pieces, and the like, as well as selecting, for example, from an array of potential fault conditions (e.g., cracked silicon wafer, environmental vibration, faulty sensor, electro-magnetic noise, and the like). In an embodiment, fault conditions may be simulated within a hardware module, and a diagnostics module may be employed to compare the simulated fault to the non-faulted simulation module outputs.

As shown in step 608, the user may review results of the simulation. In addition to reviewing input/outputs for the system's software modules, a user may review a number of metrics for evaluating the design, such as cost per work piece, throughput, equipment purchase costs, total cost for life of equipment, maintenance cost, costs for tooling user-specified custom parts, and so forth. Side-by-side analysis may be performed of alternate configurations, or of a single configuration under different operating conditions. The site may also provide an analysis engine, such as the analysis engine 302 described above to evaluate other aspects of system performance, and compare performance to alternative configurations using historical data in the data repository 304.

As shown in step 610, a user may determine whether the results are acceptable. If the results are not acceptable, the process 600 may return to step 604 where the user may configure or reconfigure a system.

If the results are acceptable, a user may proceed to enter a purchase order as shown in step 612. The process 600 may also convert the user's configuration into a specification for a completed product including, for example, a parts list, operating specifications and capacity, suggested replacement parts, and the like. The purchase order itself may be executed in any manner, and may include elements of immediate payment, as well as terms and timing of additional payments due upon delivery and satisfactory operation of the system. As shown in step 614, the process 600 may then end.

It will be appreciated that the steps of the process 600 may be varied or supplemented, or their order modified, without departing from the concepts described herein. For example, a user may be provided with an option to save a configuration for subsequent review and modification, and a user may maintain a library of saved designs. A library of designs may also be provided to a user, from which a user may select designs for customization and simulation. As another example data such as cost data may be provided during the configuration step 604, and certain simulation results may be displayed in real time during a simulation. The purchasing step 612 may be omitted entirely from the computerized process 600, with an actual purchase being conducted off line with reference to a design configured and saved using the process 600. Thus the process 600 described with reference to FIG. 6 is an example only, and in no way limits the generality of the disclosed business process for web-based design, simulation, and purchase of robotic manufacturing equipment.

It will be appreciated that the process 600 may be realized in hardware, software, any some combination of these suitable for controlling a web-based design, simulation, and purchasing system. The server side and client side of the process 600 may be realized in one or more microprocessors, microcontrollers, embedded microcontrollers, programmable digital signal processors or other programmable device, along with internal and/or external memory. Either the server side or client side of process 600 may also, or instead, include an application specific integrated circuit, a programmable gate array, programmable array logic, or any other device that may be configured to process electronic signals. It will further be appreciated that the server side or the client side of the above process 600 may be realized as computer executable code created using a structured programming language such as C, an object oriented programming language such as C++, or any other high-level or low-level programming language (including database programming languages and technologies) that may be compiled or interpreted to run on one of the above devices, as well as heterogeneous combinations of processors, processor architectures, or combinations of different hardware and software.

While the invention has been disclosed in connection with certain preferred embodiments, other embodiments will be recognized by those of ordinary skill in the art, and all such variations, modifications, and substitutions are intended to fall within the scope of this disclosure. Thus, the invention is to be understood with reference to the following claims, which are to be interpreted in the broadest sense allowable by law.

What is claimed is:

1. A system comprising:
    a programming interface for a controller for hardware;
    a simulation of the hardware selectively coupled in a communicating relationship with the programming interface;
    a physical realization of the hardware selectively coupled in a communicating relationship with the programming interface, and further selectively coupled in a communicating relationship with the simulation, wherein the programming interface, the simulation, and the physical realization are selectively interconnected under user control; and
    a diagnostics module configured to provide a communication of a relationship between the physical realization and the simulation wherein the diagnostics module performs real time comparison between the simulation and actual data;
    wherein the actual data contains information on the physical realization and the communication of the relationship by the diagnostics module identifies deviations between the actual data from the physical realization and expected data from the simulation.

2. The system of claim 1 wherein the hardware includes a manufacturing robotic system.

3. The system of claim 1 wherein the hardware includes a semiconductor manufacturing robotic system.

4. The system of claim 1 wherein the hardware includes a robotic component.

5. The system of claim 4 wherein the robotic component includes one or more of a valve, an arm, a multi-link arm, a door, a seal, an elevator, and a conveyer.

6. The system of claim 1 wherein the physical realization includes a control interface adapted to receive input signals to control the hardware.

7. The system of claim 1 wherein the physical realization includes a control interface to provide output signals from one or more sensors associated with the hardware.

8. The system of claim 1 wherein the physical realization includes one or more sensors.

9. The system of claim 8 wherein the one or more sensors includes a sensor that detects one or more of an atmospheric pressure, an ambient temperature, a work piece temperature, a vibration, an ambient light, a presence of a gas, a concentration of a gas, a presence of a compound, a motion, a voltage, a weight, and a sound.

10. The system of claim 8 wherein the one or more sensors detect a state of a component of the hardware.

11. The system of claim 10 wherein the state includes one or more of a position, a direction, a distance to a work piece, a distance to an obstruction, a valve status, a seal status, a door position, and a diagnostic state.

12. The system of claim 1 further comprising a data repository that stores one or more of control information, sensor information, and diagnostic information.

13. The system of claim 12 wherein the data repository stores real time data from the hardware.

14. The system of claim 12 wherein the data repository stores simulated real time data from the simulation.

15. The system of claim 1 wherein the programming interface includes an application programming interface that provides programmatic access to the simulation and the hardware.

16. The system of claim 15 wherein the programmatic interface includes a .NET interface.

17. The system of claim 15 wherein the programmatic interface includes a web interface.

18. The system of claim 17 wherein the diagnostics module generates messages to the programming interface related to a status of the physical realization, based upon data from the simulation.

19. The system of claim 1 wherein the diagnostics module provides real time status information for the physical realization.

20. The system of claim 1 wherein the hardware includes a robotic system, and further wherein the robotic system is trained using the simulation to provide training results.

21. The system of claim 20 wherein the training results are transferred from the simulation to the physical realization.

22. The system of claim 20 wherein the robotic system is trained with respect to one or more of collision avoidance, position, velocity, and temperature.

23. A method comprising:
providing a simulation of hardware;
providing a physical realization of the hardware;
providing a programming interface to control the hardware;
interconnecting the simulation, the physical realization, and the programming interface in a communicating relationship; and
communicating a relationship between the physical realization and the simulation by a diagnostics module wherein the diagnostics module performs real time comparison between the simulation and actual data, wherein communication of the relationship by the diagnostics module identifies deviations between the actual data from the physical realization and expected data from the simulation.

24. The method of claim 23 wherein the hardware includes a manufacturing robotic system.

25. The method of claim 23 wherein the hardware includes a semiconductor manufacturing robotic system.

26. The method of claim 23 wherein the hardware includes a robotic component.

27. The method of claim 26 wherein the robotic component includes one or more of a valve, an arm, a multi-link arm, a door, a seal, an elevator, and a conveyer.

28. The method of claim 23 wherein the physical realization includes a control interface adapted to receive input signals to control the hardware.

29. The method of claim 23 wherein the physical realization includes a control interface to provide output signals from one or more sensors associated with the hardware.

30. The method of claim 23 wherein the physical realization includes one or more sensors.

31. The method of claim 30 wherein the one or more sensors includes a sensor that detects one or more of an atmospheric pressure, an ambient temperature, a work piece temperature, a vibration, an ambient light, a presence of a gas, a concentration of a gas, a presence of a compound, a motion, a voltage, a weight, and a sound.

32. The method of claim 30 wherein the one or more sensors detect a state of a component of the hardware.

33. The method of claim 32 wherein the state includes one or more of a position, a direction, a distance to a work piece, a distance to an obstruction, a valve status, a seal status, a door position, and a diagnostic state.

34. The method of claim 23 further comprising storing one or more of control information, sensor information, and diagnostic information in a data repository.

35. The method of claim 34 wherein the data repository stores real time data from the hardware.

36. The method of claim 34 wherein the data repository stores simulated real time data from the simulation.

37. The method of claim 23 wherein the programming interface includes an application programming interface that provides programmatic access to the simulation and the hardware.

38. The method of claim 37 wherein the programmatic interface includes a .NET interface.

39. The method of claim 37 wherein the programmatic interface includes a web interface.

40. The method of claim 23 wherein the diagnostics module generates messages to the programming interface related to a status of the physical realization, based upon data from the simulation.

41. The method of claim 23 wherein the diagnostics module provides real time status information for the physical realization.

42. The method of claim 23 wherein the hardware includes a robotic system, the method further comprising training the robotic system using the simulation to provide training results.

43. The method of claim 42 further comprising transferring the training results from the simulation to the physical realization.

44. The method of claim 42 wherein the robotic system is trained with respect to one or more of collision avoidance, position, velocity, and temperature.

45. A computer program product embodied on a computer readable medium comprising:
computer executable code to simulate on a real time basis an instance of hardware;
computer executable code to control a physical realization of the instance of the hardware;
computer executable code providing a programming interface to control the hardware; and
computer executable code to selectively interconnect the computer executable code to simulate the instance of hardware, the computer executable code to control the physical realization of the instance of hardware, and the computer executable code providing a programmatic interface to control the hardware; and
computer executable code comprising a diagnostics module to provide real time interconnect between the computer executable code to simulate on a real time basis the instance of hardware with the computer executable code to control the physical realization of the instance of hardware, wherein a communication of a relationship between the physical realization and the simulation by the diagnostics module identifies deviations between the actual data from the physical realization and expected data from the simulation.

46. The computer program product of claim 45 wherein the diagnostics module generates comparative analysis.

47. The computer program product of claim 45 wherein the computer program product executes in real time.

48. The computer program product of claim 45 wherein the computer executable code to simulate the instance of hardware updates in twenty milliseconds or less.

49. The computer program product of claim 45 wherein the computer executable code to control the physical realization of the instance of hardware updates in twenty milliseconds or less.

50. The computer program product of claim 45 wherein the computer program product operates in real time.

51. A system comprising:
a simulation means for providing a simulation of hardware;
a physical realization of the hardware;
an interface means for providing a programming interface to control the hardware;
an interconnecting means for interconnecting the simulation, the physical realization, and the programming interface in a communicating relationship; and
a diagnostics module configured to provide a communication means for a relationship between a physical realization and simulation wherein the diagnostics module performs real time comparison between the simulation and actual data, wherein the communication means for the relationship by the diagnostics module identifies deviations between the actual data from the physical realization and expected data from the simulation.

52. A method for operating a robotic system comprising:
controlling the robotic system;
receiving sensor data from the robotic system;
concurrently executing a simulation of the robotic system in real time;
receiving simulated sensor data from the simulation;
comparing the sensor data to the simulated sensor data on a real time basis; and
communicating a relationship between a physical realization and the simulation by a diagnostics module, wherein the communication identifies deviations between the actual data from the physical realization and expected data from the simulation.

53. The method of claim 52, wherein the method is performed within an application programming interface for the robotic system.

54. The method of claim 53 wherein the application programming interface does not externally differentiate between the robotic system and the simulation.

55. The method of claim 52 further comprising generating one or more diagnostic messages in response to a deviation between the sensor data and the simulated sensor data.

56. The system of claim 17 wherein the diagnostics module provides statistical analysis of the deviations between the actual data and the expected data.

* * * * *

UNITED STATES PATENT AND TRADEMARK OFFICE
CERTIFICATE OF CORRECTION

| | | |
|---|---|---|
| PATENT NO. | : 7,890,194 B2 | Page 1 of 1 |
| APPLICATION NO. | : 11/302563 | |
| DATED | : February 15, 2011 | |
| INVENTOR(S) | : Patrick Pannese | |

It is certified that error appears in the above-identified patent and that said Letters Patent is hereby corrected as shown below:

Title Page; item (56);
Column 2, line 2, in Other Publications, delete "Vechiles" and insert -- Vehicles --, therefor.

Signed and Sealed this

Thirteenth Day of September, 2011

David J. Kappos
*Director of the United States Patent and Trademark Office*